United States Patent [19]

Takano

[11] Patent Number: 4,845,738
[45] Date of Patent: Jul. 4, 1989

[54] HANDS-FREE TYPE AUTOMOBILE TELEPHONE AND GENERAL-PURPOSE TELEPHONE

[75] Inventor: Katsuyuki Takano, Tokyo, Japan

[73] Assignee: Bohsei International Co., Ltd., Tokyo, Japan

[21] Appl. No.: 236,425

[22] Filed: Aug. 25, 1988

[30] Foreign Application Priority Data

Jun. 7, 1988 [JP] Japan ............................ 63-138464

[51] Int. Cl.⁴ ............................................. H01M 1/23
[52] U.S. Cl. ..................................... 379/58; 455/90;
  379/424; 379/443
[58] Field of Search .................. 379/58, 56, 351, 422,
  379/424, 425, 426, 437, 443, 445, 454, 451, 455;
  455/90

[56] References Cited

U.S. PATENT DOCUMENTS

| | | | |
|---|---|---|---|
| 3,167,617 | 1/1965 | Gerhardt | 379/455 |
| 3,657,479 | 4/1972 | Sweenie et al. | 379/443 |
| 4,476,354 | 10/1984 | Uchino et al. | 379/445 |
| 4,698,838 | 10/1987 | Ishikawa et al. | 379/58 |
| 4,709,289 | 11/1987 | Langenberg | 379/424 |
| 4,710,596 | 12/1987 | Kurokawa | 379/424 |
| 4,723,281 | 2/1988 | Peiker et al. | 379/433 |
| 4,776,553 | 10/1988 | Kubayashi | 248/558 |

*Primary Examiner*—Robert Lev
*Attorney, Agent, or Firm*—Spencer & Frank

[57] ABSTRACT

The automobile telephone is used in a hands-free condition by coupling its handset with a cradle-shaped coupler which is provided with a pair of swingable support plates for receiving a transmitter portion and a receiver portion of the handset in use to make it possible to receive the handset regardless its size and mounting angle. On a back surface of the swingable support plates are provided a speaker and a microphone which are coupled with the transmitter portion and the receiver portion of the handset respectively so as to make it possible to use the telephone in a hands-free condition through these speaker and microphone incorporated in the cradle-shaped coupler.

4 Claims, 3 Drawing Sheets

HANDS-FREE TYPE AUTOMOBILE TELEPHONE AND GENERAL-PURPOSE TELEPHONE

BACKGROUND OF THE INVENTION

1. Field of the Invention:

The present invention relates to telephones of various types, and more particularly to a hands-free type automobile telephone and a general-purpose telephone, the hands-free type telephone being provided with an audio amplifier and classified into International Patent Classification Nos.: H04M 1/60 and 1/04.

2. Description of the Prior Art:

In recent years, automobile telephones are used extensively, and, therefore, automobiles provided with the automobile telephones increase. In use, a user of the automobile telephone holds a handset of the telephone in his hand. Consequently, when a driver uses the automobile telephone, he is forced to drive a car through one-handed operation while restricted in freedom of his head movement, which seriously influences safety driving of the car.

In order to ensure safety driving of the car, hitherto, there is employed a hands-free type telephone comprising: a handset having a transmitter at one end thereof and a receiver at the other end thereof; a cradle-shaped coupler for supporting the handset at opposite ends thereof, the cradle-shaped coupler being provided with a two-way amplifier circuit having a speaker oppositely disposed from the transmitter of the handset and a microphone oppositely disposed from the receiver of the handset; a separate microphone connected with the speaker of the cradle through an electronic circuit; and a separate speaker connected with the microphone of the cradle through the electronic circuit; whereby the telephone is used through the separate speaker and the separate microphone in hands-free condition.

In such commercially available conventional hands-free type telephone, there is no standard with respect to the handset thereof in size and mounting angle of its transmitter and receiver. Accordingly, in order to prevent a howling action or a high-pitched audio tone put out by the receiver, so as to permit the telephone to be suitably operated, which howling action is resulted from misalignment in coupling of the handset with the cradle-shaped coupler, the handset must be an exclusive one or must be selected in size and mounting angle so as to align with individual cradle-shaped couplers.

In addition, in order to prevent the howling action, it is necessary to considerably reduce audio volume and tone so as to prevent sounds put out by the speaker from entering the microphone, which makes it difficult to recognize contents of the sounds.

SUMMARY OF THE INVENTION

It is an object of the present invention to provide a hands-free type automobile telephone and a general-purpose telephone comprising: a handset having a transmitter at one end thereof and a receiver at the other end thereof; a cradle-shaped coupler mounted in a vehicle for supporting the handset at opposite ends thereof through a pair of swingable support plates, the cradle-shaped coupler provided with a two-way amplifier circuit having a small-sized speaker oppositely disposed from the transmitter of the handset and a microphone oppositely disposed from the receiver of the handset, the small-sized speaker being mounted on a back surface of one of the support plates so as to be swingable, the microphone being mounted on a back surface of the other of the support plates so as to be swingable, the support plates being provided with locking means for locking the handset to the cradle-shaped coupler so as to press the transmitter and the receiver of the handset against the support plates; a separate microphone connected with the speaker of the cradle-shaped coupler through an electronic circuit; and a separate speaker connected with the microphone of the cradle-coupler through the electronic circuit; whereby the telephone is used through the separate speaker and the separate microphone in hands-free condition in a condition in which the handset is mounted in the crade-shaped coupler.

It is another object of the present invention to provide a hands-free type automobile telephone and a general-purpose telephone a handset of which is surely coupled with a cradle-shaped coupler thereof even if the handset varies in size and mounting angle, so that external noise is prevented from entering the telephone.

It is still another object of the present invention to provide a hands-free type automobile telephone and a general-purpose telephone which is operated in a hands-free condition in which a handset of the telephone is coupled with a cradle-shaped coupler of the telephone in use.

DESCRIPTION OF THE PREFERRED EMBODIMENTS

Figure 1:
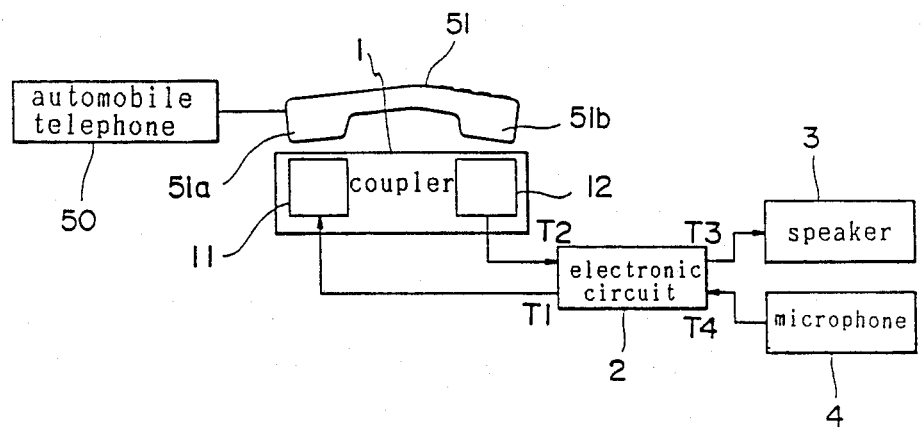
FIG. 1 is a block diagram view of the entire construction of the hands-free type automobile telephone and a general-purpose telephone of the present invention.

FIG. 1 is a block diagram view of the entire construction of the hands-free type automobile telephone and a general-purpose telephone of the present invention.

In the drawings, the reference 1 denotes a cradle-shaped coupler of a hands-free type automobile telephone 50 of the present invention a handset 51 of which is mounted on the cradle-shaped coupler 1 in which are incorporated a speaker 11 for transmitting use and a microphone 12 for receiving use. Through an electronic circuit 2 comprising a suitable amplifier circuit and a suitable switching circuit, the speaker 11 and the microphone 12 are connected with another microphone 4 and another speaker 3, respectively.

Figure 2:
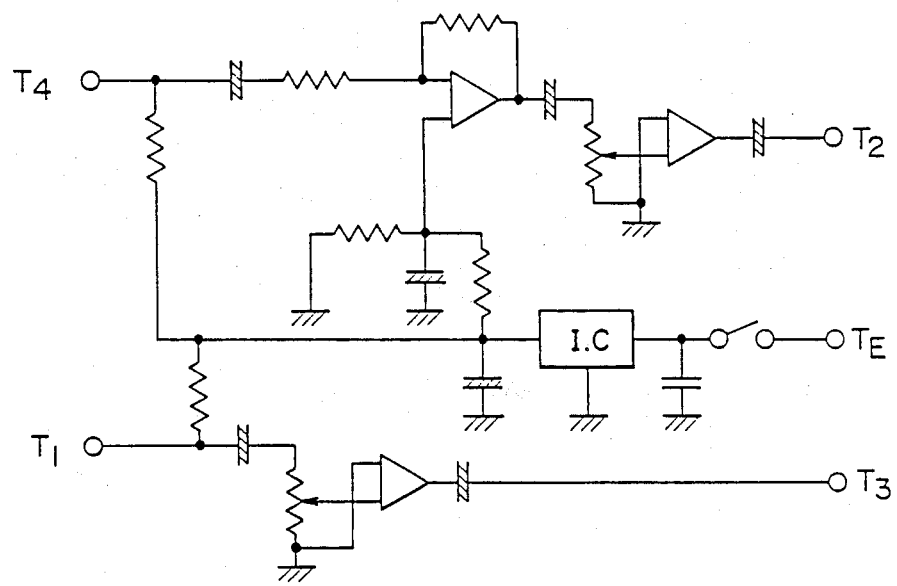
FIG. 2 is a circuit diagram of control system for operating the telephone of the present invention shown in FIG. 1.

As shown in FIGS. 1 and 2, in the telephone of the present invention, the microphone 12 is so arranged as to be oppositely disposed from a receiver portion 51b of the handset 51, while connected with an input terminal $T_2$ of the electronic circuit 2. On the other hand, the speaker 11 is so arranged as to be oppositely disposed from a transmitter portion 51a of the handset 51, while connected with an output terminal $T_1$ of the electronic circuit 2. A separate speaker 3 is connected with a speaker terminal $T_3$ of the electronic circuit 2, through which speaker terminal $T_3$ an output signal is issued to the speaker 3. A separate microphone 4 is connected with a microphone terminal $T_4$ of the electronic circuit 2. Consequently, the electronic circuit 2 is provided with the terminals $T_1$, $T_2$, $T_3$ and $T_4$.

Figure 3:
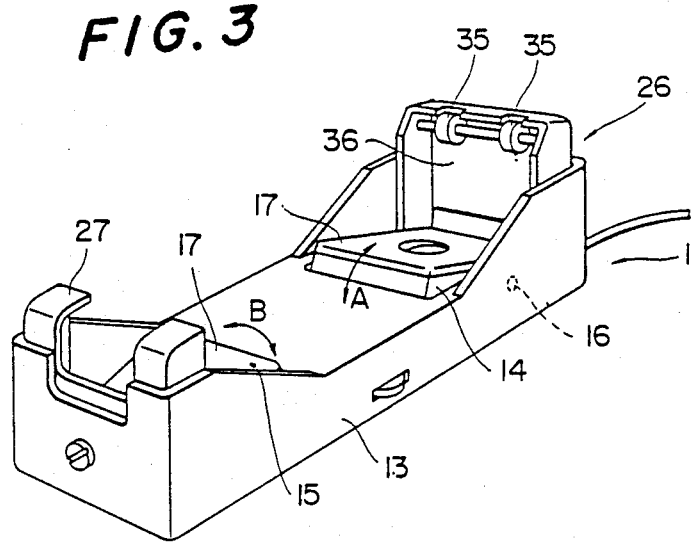
FIG. 3 is a perspective view of an embodiment of the cradle-shaped coupler for receiving the handset of the telephone of the present invention shown in Fig. 1
Figure 4:
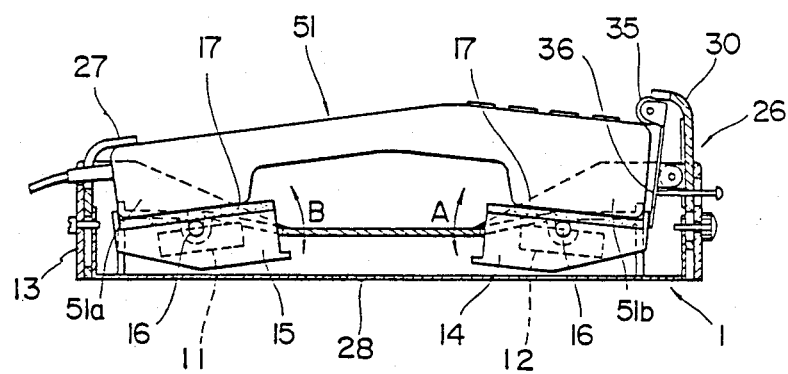
FIG. 4 is a longitudinal sectional view of the cradle-shaped coupler coupled with the handset of the present invention shown in FIG. 3.
Figure 5:
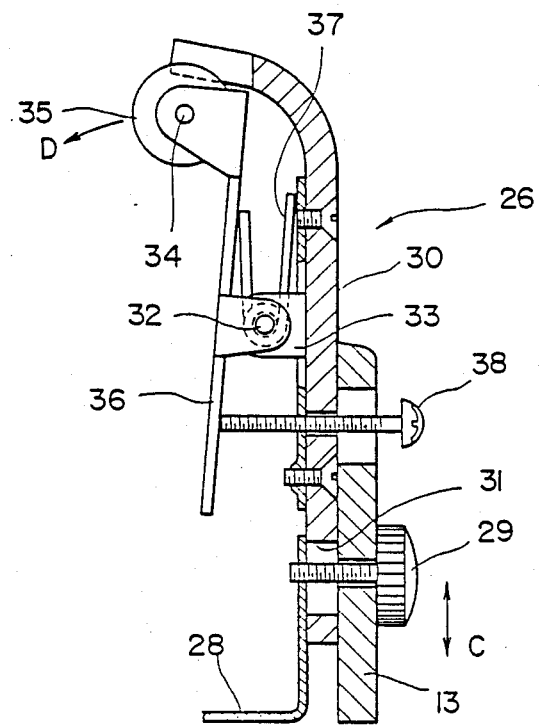
FIG. 5 is an enlarged sectional view of the locking means of the cradle-shaped coupler for receiving the handset of the present invention shown in FIG. 4.

In FIGS. 3 to 5, there is shown an embodiment of the cradle-shaped coupler 1 for receiving the handset 51 of the automobile telephone of the present invention.

The cradle-shaped coupler 1 has a case 13 in opposite end portions of which are provided a receiver-support plate 14 and a transmitter-support plate 15. The receiver portion 51b, of the handset 51 is supported by the receiver-support plate 14 of the cradle-shaped coupler 1, while the transmitter portion 51a of the handset 51 is supported by the transmitter-support plate 15 of the coupler 1. Each of the receiver-support plate 14 and the transmitter-support plate 15 is swingable in a direction indicated by an arrow "A" or "B" shown in FIG. 3 at its substantially central portion mounted on a pin 16 which is transversely mounted in opposite side plates of the coupler 1 as shown in FIG. 3. A suitable abutting member 17 is provided in an abutting surface of each of the transmitter-support plate 15 and the receiver-support plate 14 of the coupler 1 in an adhering manner. The abutting member 17 is made of material such as sponge rubber and foamed polystyrene resin provided with cushioning properties and audio-sealing properties. Through the abutting member 17, the receiver portion 51b and the transmission portion 51a of the handset 51 are brought into close contact in their peripheral portions with the receiver-support plate 14 and the transmitter-support plate 15 of the coupler 1, respectively. Namely, in a central portion of the receiver-support plate 14 of the coupler 1 is provided a through-hole which faces the microphone 12 fixedly mounted on the back surface of the receiver-support plate 14. On the other hand, a plurality of through-holes are provided in the transmitter-support plate 15 on the back surface of which is fixedly mounted the small-sized speaker 11. As shown in FIG. 3, a handset-locking mechanism (26, 27) is provided in the case 13 of the coupler 1. In the handset-locking mechanism (26, 27) of the coupler 1, a handset-insertion adjusting member 26 is provided in an end portion of the case 13 of the coupler 1 so as to be adjacent to the receiver-support plate 14. On the other hand, an engaging member 27 provided with a pair of hook-like engaging ends is so mounted on the other end portion of the case 13 of the coupler 1 as to be adjusted in its vertical height relative to the end portion of the case 13.

As clearly shown in FIG. 5, in the handset-insertion adjusting member 26 of the coupler 1, a bottom plate 28 fixed to the case 13 of the coupler 1 is threadably engaged with a height-adjusting screw 29 which passes through an elongated hole or slot 31 formed in a support plate 30 to make it possible to adjust the support plate in its vertical height relative to the case 13 of the coupler 1. A bearing member 33 on which is provided a pin 32 is fixed to the support plate 30. A roller arm 36 is swingably mounted on the pin 32 of the bearing member 33. A pair of rollers 35 made of a suitable resilient material such as soft synthetic resin and the like are rotatably mounted on a top end portion of the roller arm 36 through a roller shaft 34. A compression spring 37 is interposed between the roller arm 36 and the bearing member 33 fixed to the support plate 30 so as to resiliently urge the rollers 35 of the roller arm 36 away from the support plate 30 in a direction indicated by an arrow "D" of FIG. 5. On the other hand, a front-end portion of a roller-positioning screw 38 threadably engaged with the bearing member 33 abuts on a free-end portion of the roller arm 36 so as to adjust a swinging amount of the roller arm 36 in the case 13 of the coupler 1, whereby the coupler 1 is aligned in length and mounting angle with any of the handset 51 of the commercially available telephone 50.

Incidentally, the speaker 3 and the microphone 4 connected with the electronic circuit 2 according to the present invention are preferably independently provided. For example, the speaker 3 may be replaced with a speaker employed in an audio instrument mounted on the automobile.

Since the hands-free type automobile telephone and a general-purpose telephone of the present invention has the above construction, in use, a power-input terminal "$T_E$" of the electronic circuit 2 shown in FIG. 2 is connected with a socket for a cigarette-lighter of the automobile. In the automobile telephone 50, when there is a telephone call or the user wants to make a telephone call, the handset 51 of the automobile telephone 50 is mounted on the case 13 of the coupler 1 so as to mount the receiver portion 51b of the handset 51 on the receiver-support plate 14 of the coupler 1 and the transmitter portion 51a of the handset 51 on the transmitter-support plate 15 of the coupler 1, whereby the receiver portion 51b and the transmitter portion 51a of the handset 51 are brought into close contact with the receiver-support plate 14 and the transmitter-support plate 15 through the abutting members 17, respectively.

Namely, in use, in a condition in which an end portion of the transmitter portion 51a of the handset 51 of the automobile telephone 50 is aligned with the transmitter-support plate 15 of the coupler 1 and pressed thereagainst so as to be engaged with the pair of the engaging hook-like ends of the engaging member 27, an end portion of the receiver portion 51b of the handset 51 is pressed against the engaging rollers 35 of the roller arm 36. Since the roller arm 36 is resiliently urged away from the support plate 30 in the direction indicated by the arrow "D" through the compression spring 37 so as to be swingable or rotatable on the pin 32 mounted on the bearing member 33 fixed to the support plate 30, when the end portion of the receiver portion 51b of the handset 51 passes over the engaging rollers 35, the engaging rollers 35 are forced to return to their initial positions under the influence of a resilient force exerted by the compression spring 37 so that the engaging rollers 35 rest on an outer shoulder portion of the receiver portion 51b of the handset 51 as shown in FIG. 4, whereby the handset 51 is surely mounted on the coupler 1. As a result, the receiver portion 51b and the transmitter portion 51a of the handset 51 are brought into close contact with the receiver-support plate 14 and the transmitter-support plate 15 of the coupler 1 through the abutting member 17, respectively. At this time, since the receiver-support plate 14 and the transmitter-support plate 15 of the coupler 1 are suitably rotated on the pins 16 in the directions indicated by the arrows "A" and "B" respectively, the abutting members 17 are surely brought into close contact with the receiver portion 51b and the transmitter portion 51a of the handset 51.

In the hands-free type automobile telephone and the general-purpose telephone of the present invention, since the cradle-shaped coupler 1 is provided with the handset-locking mechanism (26, 27) for locking the handset 51 to the case 13 of the cradle-shaped coupler 1 and the swingable support plates 14 and 15 rotatable on the pins 16, it is possible to align the cradle-shaped coupler 1 to the handset 51 even if the handset 51 varies in size and its mounting angle relative to the coupler 1. Consequently, the cradle-shaped coupler 1 of the present invention can be aligned to substantially any of the commercially available handsets of the telephones so as to make it possible to prevent external noise from entering the telephone, whereby the telephone is improved in tone of its sounds and contributes to the safety driving of the automobile. Therefore, in this respect, the effect of the present invention is very large.

What is claimed is:

1. A hands-free type automobile telephone and a general-purpose telephone comprising: a handset having a transmitter at one end thereof and a receiver at the other end thereof; a cradle-shaped coupler mounted in a vehicle for supporting said handset at opposite ends thereof through a pair of swingable support plates, said cradle-shaped coupler provided with a case and a two-way amplifier circuit having a small-sized speaker oppositely disposed from said transmitter of said handset and a microphone oppositely disposed from said receiver of said handset, said small-sized speaker being mounted on a back surface of one of said support plates so as to be swingable, said microphone being mounted on a back surface of the other of said support plates so as to be swingable, said support plates being provided with locking means for locking said handset to said cradle-shaped coupler so as to press said transmitter and said receiver of said handset against said support plates; a separate microphone connected with said speaker of said cradle-shaped coupler through an electronic circuit; and a separate speaker connected with said microphone of said cradle-coupler through said electronic circuit; whereby said telephone is used through said separate speaker and said separate microphone in hands-free condition in a condition in which said handset is mounted in said cradle-shaped coupler.

2. The hands-free type automobile telephone and the general-purpose telephone as set forth in claim 1, wherein:

said handset-locking mechanism comprises an engaging member provided with a pair of hook-like engaging ends, said engaging member being so mounted on an end portion of said case of said cradle-shaped coupler so as to be adjusted in its vertical height relative to said end portion of said case of said cradle-shaped coupler.

3. The hands-free type automobile telephone and the general-purpose telephone as set forth in claim 1, wherein:

said handset-locking mechanism comprises a handset-insertion adjusting member provided in the other end portion of said case of said cradle-shaped coupler so as to be adjacent to said receiver-support plate, in which handset-insertion adjusting member a roller arm is swingably mounted on the other end portion of said case while so mounted as to be adjustable in its height relative to said case through a height-control screw, said roller arm being provided with a pair of rotatable engaging rollers in its top-end portion while constantly resiliently urged against the other end portion of said case of said cradle-shaped coupler.

4. The hands-free type automobile telephone and the general-purpose telephone as set forth in claim 2, wherein:

said handset-locking mechanism comprises a handset-insertion adjusting member provided in the other end portion of said case of said cradle-shaped coupler so as to be adjacent to said receiver-support plate, in which handset-insertion adjusting member a roller arm is swingably mounted on the other end portion of said case while so mounted as to be adjustable in its height relative to said case through a height-control screw, said roller arm being provided with a pair of rotatable engaging rollers in its top-end portion while constantly resiliently urged against the other end portion of said case of said cradle-shaped coupler.

* * * * *